United States Patent [19]

Möller

[11] 4,402,338
[45] Sep. 6, 1983

[54] STEM FOR A DOUBLE SEAT VALVE

[75] Inventor: Rudolf Möller, Gehrden, Fed. Rep. of Germany

[73] Assignee: WABCO Fahrzeugbremsen GmbH, Hanover, Fed. Rep. of Germany

[21] Appl. No.: 180,280

[22] Filed: Aug. 22, 1980

[30] Foreign Application Priority Data

Aug. 30, 1979 [DE] Fed. Rep. of Germany ....... 2935005

[51] Int. Cl.³ ............................................. F16K 51/00
[52] U.S. Cl. ................................. 137/315; 137/625.5; 403/345
[58] Field of Search ............. 137/625.5, 625.27, 625.4, 137/315; 251/356, DIG. 5, 357; 24/230 AS, 213 B, 213 CS, 213 R; 403/354, 364, 405, 408, 345

[56] References Cited

U.S. PATENT DOCUMENTS

| | | | |
|---|---|---|---|
| 1,764,240 | 6/1930 | Blustein | 24/230 AS |
| 2,554,876 | 5/1951 | Olsen | 403/345 |
| 2,601,989 | 7/1952 | Modes | 137/625.4 |
| 3,168,770 | 2/1965 | John, Jr. et al. | 24/230 AS |
| 3,489,987 | 1/1970 | Niskin | 403/364 |
| 4,074,694 | 2/1978 | Lee | 251/357 |
| 4,147,184 | 4/1979 | Jess | 251/DIG. 5 |
| 4,237,931 | 12/1980 | Rafaely | 137/625.5 |

Primary Examiner—Alan Cohan
Assistant Examiner—John A. Rivell
Attorney, Agent, or Firm—J. B. Sotak

[57] ABSTRACT

A two-way tappet valve assembly including a housing having an axial bore and a pair of opposed annular valve seats. A movable carrier including a pair of identical push rods each having a forked stem portion and an enlarged head portion for receiving a respective elastic valve disk which cooperate with the annular valve seats to open and close communication with the axial bore. The forked stem portions are inserted in the axial bore and are snap fastened together by a plurality of inclined ears and matching recesses.

5 Claims, 4 Drawing Figures

STEM FOR A DOUBLE SEAT VALVE

FIELD OF THE INVENTION

The invention concerns a movable push rod valve member for a double seated valve and more particularly to a two-way valve having a housing with an axial bore having a pair of opposed seats which are selectively opened and closed by a movable carrier which includes a pair of valve members and a pair of identical push rods having enlarged head portions and forked positions which are snap connected together to form a stem which fits into the axial bore.

BACKGROUND OF THE INVENTION

In the case of double seated valves, it is advantageous to design the valve seats as part of the valve housing. Thus the distance between the valve seats is determined in advance. However, in the case of such double seated valve, the valve seats are arranged so that a push rod which carries the valve disks is movably mounted between the valve seats in longitudinal direction with the valve seats being arranged between the valve disks. Such a design results in the need to satisfy at least two requirements. First the design necessitates the use of several parts which can be assembled in the proper order and in a simple manner during installation of a push rod carrier or a part of it. Second, despite the multipart arrangement of valve disks and push rods, it must be ensured that the required distance between the valve disks is exactly the same even if they are produced in mass.

OBJECTS OF THE INVENTION

An object of this invention is to provide a new and improved push rod carrier for a double seated valve which fulfills the previously mentioned requirements at a small cost and with little design effort.

It is another object of this invention to provide a double seated valve assembly comprising, a housing having an inner body portion having an axial bore and a pair of annular valve seats, a movable carrier having a pair of push rods, each of the push rods includes an enlarged head portion on a first end for receiving a valve disk which cooperates with the annular valve seats to selectively open and close communication with the axial bore, each of the push rods includes a forked portion on a second end, the forked portions include at least one inwardly disposed ear, each of the push rods includes at least one recess formed intermediate its ends for receiving the inwardly disposed ear to lock the push rods together when the push rods are inserted into the axial bore and the forked portions are joined together.

By the use of two identically designed push rod parts and by the fact that no additional means are required for the assembly of the two push rod parts or for the fastening of the valve disks, the result is a simple mounting arrangement for the parts which are substantially the same. The use of a special snap connection between the push rod parts allows a rapid and very simple mounting.

DESCRIPTION OF THE DRAWINGS

The invention will be explained in more detail on the basis of a design example.

DETAILED DESCRIPTION OF THE INVENTION

Figure 1:
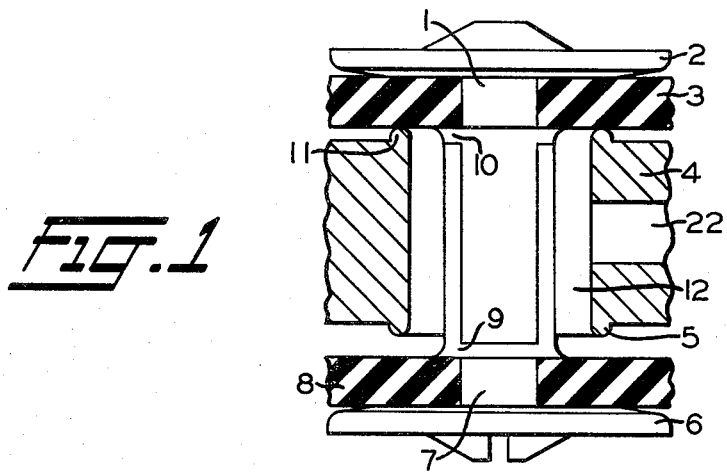
FIG. 1 shows a part of the double seated top at valve assembly with a push rod which carries two valve disks.

Referring now to FIG. 1 there is shown a double seated or two-way valve assembly which includes a valve housing which is partly broken away. A pair of annular valve seats 5 and 11 are formed on the opposed ends of an inner ring-shaped barrel or body portion 4 of the valve housing. The valve seats 5 and 11 form the two separate valves of the double seated valve with two respective valve disks 8 and 3.

The two valve disks 8 and 3 are each constructed of elastic material which may take the form of a washer-like membrane which may be mounted on a movable carrier having a pair of push rod 1, 7. The stem of each part of the push rods is disposed in a bore hole 12 formed in the center of hollow ring-shaped body portion 4. The push rod assembly is formed of two identically designed parts 1 and 7 which are each provided with a forked or bifurcated stem. The stems are turned to each other and are inserted into each other like a snap connection. That is the stems of the push rods 1 and 7 are turned 90° relative to each other prior to insertion.

The part 1 of the push rod includes an enlarged plate-like member 2 on its upper end, which has a flat side to serve as an abutment for the elastic valve plate 3. A collar shaped shoulder 10 serves as a second abutment for elastic valve disk 3. The outside diameter of the annular collar 10 is dimensioned in such a way that the push rod stem 1 can be inserted through a corresponding bore hole formed in the center of valve disk 3. The valve disk 3 therefore lies between the 2 and the shoulder 10. Correspondingly, the other valve disk 8 of push rod part 7 lies between shoulder 9 and enlarged head 6.

It will be seen that when the push rod 1, 7 holds valve 11, 3 in the position, as shown, the valve 5, 8 is opened. Thus, a fluid flows through conduit 22 and into bore hole 12, and it can therefore readily flow through valve 5, 8.

In the other extreme position, the push rod 1, 7 holds the valve 11, 3 opened, while valve 5, 8 is closed. In this case, fluid flows through the conduit 22 and into bore hole 12, and then it can flow unimpeded through valve 11, 3. Therefore, push rod 1, 7 selectively switches the chamber formed by bore hole 12 to one of two different chambers, which are, connected to valves 11, 3 and 5, 8, respectively.

As previously mentioned the push rod consists of two identical parts 1 and 7 which can be simply snap connected together. Further, the mounting of the elastic valve disks 3 and 8 to the push rod parts 1 and 7 is simple, cost saving and can be carried out quite rapidly.

Figure 2:
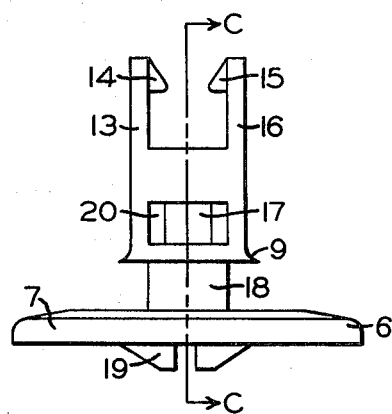
FIG. 2 shows a side view of the lower part of the push rod.

Referring now to FIG. 2 there is shown one of the push rods separately, which was illustrated in FIG. 1. The push rod 7 includes two arms 13 and 16 which form a fork or bifurcation on the end remote from head 6. The free ends of the arms 13 and 16 are each provided with an inwardly projecting ear 14, 15. The ears 14 and 15 are disposed on the inside of the fork are inclined downwardly in such a way that the distance between the end of the push rod part 7 is enlarged.

The push rod part 7 has two recesses 17 formed intermediate its ends and arranged on opposite lying sides, which are designed and arranged in such a way that they serve for locking the inclined ears of the push rod 1, which are equal to ears 14 and 15 of the push rod part 7.

A marking slit 19 is formed on the outerside of plate-like head 6. The slot serves as a marker for readily determining and recognizing the rotating position of the push rod with respect to bore hole 12 of valve housing 4 as shown in FIG. 1. The reduced portion 18 between the collar-shaped shoulder or flange 9 and the plate-like head portion 6 serve to sent the washer-like elastic valve disk, not shown in FIGS. 2, 3 and 4, onto the push rod 7.

Figure 3:
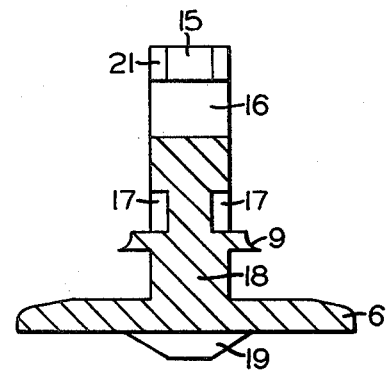
FIG. 3 shows a cross sectional view of the lower push rod taken along line C—C of FIG. 2.
Figure 4:
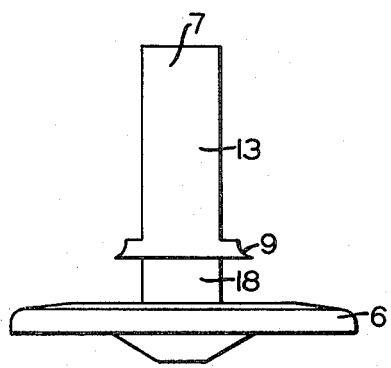
FIG. 4 shows a side view of the lower push rod of FIG. 2.

In viewing FIG. 3 there is shown a cross section view along line C—C of the push rod part 7 as illustrated in FIG. 2. It is that of the snap-in ears 14 and 15 not only are tapered in lengthwise direction of the push rod, but also are tapered laterally as shown by correspondingly tapered surfaces 21. The tapered surfaces 21 mate with the corresponding oblique surfaces 20 formed, in recess 17 of the respective push rods. In this manner it is guaranteed that the arms 13 and 16 of push rod parts are optimally ready. Finally, FIG. 4 shows a side view of the push rod 7 as shown in FIG. 2.

Moreover, when the push rod parts are put or joined together they form a circular cross section.

It is recognized that the identically formed push rod parts 7 and 1 provide a definite distance between the enlarged heads 6 and 2 after being inserted into each other and after engagement of the snap connection. This means that if the production-technical are very exactly adhered to, the interval between the valve seats 11 and 5 (FIG. 1) and with a predetermined movement stroke of push rod 1, 7, appropriate accuracy is achieved during the actuation of valves 11, 3 and 5, 8.

The push rod parts 1 and 7 can be made in a simple manner while achieving very great manufacturing precision, as plastic cast parts.

The use of the invention is not limited to only double seated valves, namely, where the valve seats are arranged between the valve disks but the invention can also be used where the valve disks and also the push rods are arranged between the valve seats.

Having thus described my invention, what I claim as new and desire to secure by Letters Patent, is:

1. A double seated valve assembly comprising, a housing having an inner body portion, said inner body portion having an axial bore and a pair of annular valve seats, a movable carrier having a pair of push rods, each of said push rods includes an enlarged head portion on a first end for receiving a valve disk which cooperates with said annular valve seats to selectively open and close communication with said axial bore, each of said push rods includes forked portion on a second end, said forked portions include at least one inwardly disposed ear having tapered side portions, each of said push rods includes at least one recess having oblique side portions formed on opposite sides from said forked portions and intermediate its end for receiving said inwardly disposed ear which are assisted by said tapered and oblique side portions to positively lock said push rods together when said push rods are inserted into said axial bore and said forked portions are snapped together.

2. The double seated valve as defined in claim 1, wherein each of said forked portions includes two arms with each of said two arms provided with an inwardly disposed ear.

3. The double seated valve assembly as defined in claim 1, wherein each of said inwardly disposed ears are tapered in such a way that its mutual distance to the outside end of said two arms is increased.

4. The double seated valve assembly as defined in claim 1, wherein each of the enlarged head portions of said push rods are provided with a flat side to form an abutment for said valve disk.

5. The double seated valve assembly as defined in claim 4, wherein each of said push rods includes a collar like shoulder near said enlarged head portion, the outer diameter of said collar like shoulder is slightly larger than a hole formed in the center of said valve disk which is constructed of an elastic material.

* * * * *

UNITED STATES PATENT AND TRADEMARK OFFICE
CERTIFICATE OF CORRECTION

PATENT NO. : 4,402,338
DATED : September 6, 1983
INVENTOR(S) : Rudolf Moller

It is certified that error appears in the above-identified patent and that said Letters Patent are hereby corrected as shown below:

Column 4, line 14, after "includes", insert --a--

Signed and Sealed this

Seventeenth Day of January 1984

[SEAL]

Attest:

GERALD J. MOSSINGHOFF

Attesting Officer

Commissioner of Patents and Trademarks